Figures 1, 2:
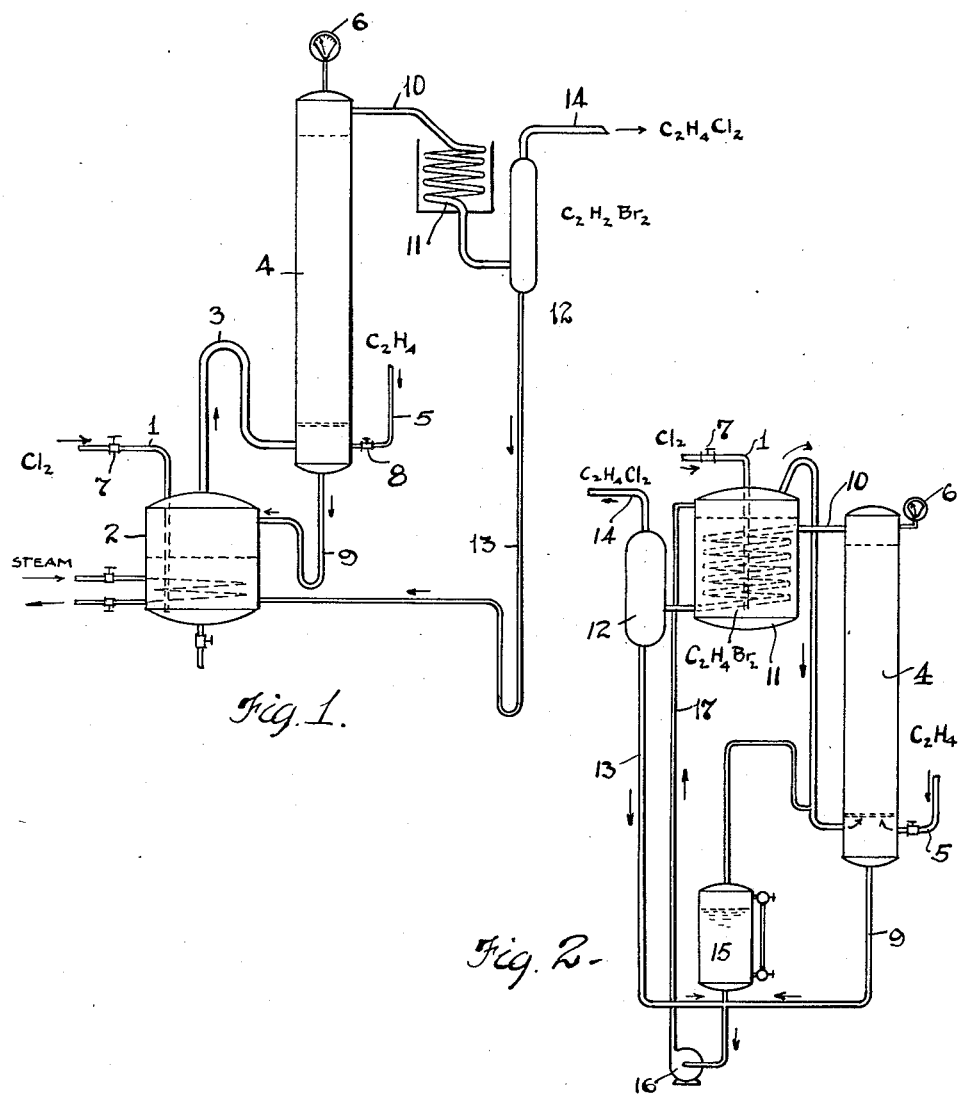

Jan. 12, 1932.   H. H. DOW   1,841,279

MANUFACTURE OF HALOGENATED ALIPHATIC HYDROCARBONS

Filed Dec. 26, 1928

INVENTOR.
Herbert H. Dow
BY
Day, Oberlin & Day
ATTORNEYS.

Patented Jan. 12, 1932

1,841,279

UNITED STATES PATENT OFFICE

HERBERT H. DOW, OF MIDLAND, MICHIGAN, ASSIGNOR TO THE DOW CHEMICAL COMPANY, OF MIDLAND, MICHIGAN, A CORPORATION OF MICHIGAN

MANUFACTURE OF HALOGENATED ALIPHATIC HYDROCARBONS

Application filed December 26, 1928. Serial No. 328,505.

The present invention relates to methods of making halogen derivatives of aliphatic hydrocarbons, and particularly to methods wherein said derivatives are formed by direct addition of halogen to gaseous hydrocarbons of the $C_nH_{2n}$ and $C_nH_{2n-2}$ series.

Taking, for example, the reaction of ethylene and chlorine for the formation of the ethylene dichloride, it is well known that this reaction is difficult to control. When the respective gases are brought together directly, the avidity with which combination occurs, once the reaction has been initiated, may lead to the sudden development of much heat accompanied by an excessive rise of temperature. Often explosions take place, resulting in the formation of soot and other decomposition products, which give rise to diminished yields of the desired product and contamination thereof by impurities, thus necessitating further purification steps for their removal.

Various methods have been proposed for moderating the violence of the above reaction, such that it may be adequately controlled. For example, it has been proposed to employ a considerable excess of one of the reacting gases, or to carry out the reaction in the presence of an inert diluent gas, or further to introduce the reacting gases into the body of a liquid co-solvent wherein the reaction would take place. These and other similar methods, however, suffer from serious drawbacks when applied to large scale commercial operations in that they involve separating the reaction product from a relatively large volume of diluting gases on the one hand, or, on the other, of maintaining a considerable liquid volume of co-solvent and accumulated reaction product at a more or less elevated temperature during the continuance of the process.

I have now discovered an improved method of procedure whereby the aforementioned disadvantages are overcome, such improved method being particularly adaptable to large scale production. To the accomplishment of the foregoing and related ends the invention, then, consists of the steps hereinafter fully described and particularly pointed out in the claims, the annexed drawings and following description setting forth but a few of the ways in which the principle of the invention may be used.

In said annexed drawings:

Fig. 1 illustrates diagrammatically one arrangement of apparatus suitable for carrying out the invention. Fig. 2 illustrates an alternative arrangement.

In reactions of the character in hand it is known that bromine reacts much more smoothly than does chlorine. While the procedure for chlorinating requires special precautions for moderating the violence of the reaction and preventing explosions, such precautionary measures may be wholly or largely dispensed with in the case of bromination reactions. I have found further that the presence of vapors of such brominated compounds in the zone of reaction between gaseous chlorine and ethylene, for example, has a marked beneficial effect in restraining the tendency of the reaction to get out of control and in mitigating the consequences of too rapid and precipitate combination. In other words there appears to be an anti-detonative effect that is exercised by the organic bromide, and also by the corresponding iodides, tending to prevent or repress molecular decomposition of the reacting substances or products. By such means I am enabled to conduct the reaction between chlorine and ethylene, or other unsaturated gaseous aliphatic hydrocarbon, entirely in the gas phase, the reactants being introduced substantially in combining proportions without necessity for employing any large volume of diluent gases, and at the same time to maintain a suitable control thereof that precludes or at least largely avoids the occurrence of explosions and the resultant formation of decomposition products. The vapors of aliphatic bromide are preferably introduced continuously along with one of the reacting gases, and of course are carried out of the reaction zone along with the reaction products. Since they have a vapor density relatively great as compared with the chlorinated derivatives, as well as a much higher boiling point, the separation of the brominated from the chlorinated compounds in the reaction product is a simple procedure by usual means, as by fractional condensation or fractional distillation or a combination of both methods. The recovered brominated compound may then be returned to the reaction, a relatively small amount thereof serving continuously for the production of a large amount of chlorinated product.

As an example of the application of my improved method, the production of ethylene dichloride will be described. Referring to Fig. 1, chlorine gas is introduced under moderate pressure through pipe 1 leading beneath the surface of a body of ethylene dibromide in vessel 2. A steam coil is provided for maintaining the temperature of the ethylene dibromide at a point to give a sufficient concentration of the vapors thereof in the following stage of chlorination. The gas bubbles up through the ethylene bromide and becomes saturated with the vapor of the latter, passing thence through pipe 3 into the base of the chlorinator 4. Ethylene is introduced into the base of the chlorinator through pipe 5, and the two gas streams mingle and pass upwardly through the chlorinator, which may be filled with a suitable packing of inert porous material such as coke or pumice. If desired, also, such packing may serve as carrier for a catalyst, although the use of a catalyst is not necessary to the invention. Reaction takes place smoothly and without explosions between the ethylene and chlorine in the presence of vapors of ethylene dibromide. Some heat is developed, sufficient to maintain the reaction product as vapor within the chlorinator. A temperature indicating instrument 6 is used for the purpose of regulating the operation of the process, the flow of gases to the chlorinator being controlled by means of valves 7 and 8 so that the temperature is maintained preferably between the limits 40° to 100° C. If desired an automatic device for operating valves 7 and 8 may be installed, such device being controlled by means of the temperature registering instrument 6. Return pipe 9 provides for returning any condensed ethylene dibromide to vessel 2. The vapors of ethylene dichloride containing some ethylene dibromide leave the chlorinator through pipe 10 and pass through condenser coil 11 where most of the ethylene bromide is condensed and separates out in separator 12, being returned to vessel 2 through pipe 13. The vapors of ethylene chloride, together with any residual unreacted gases, pass out through pipe 14 to a suitable condensing and collecting apparatus not shown. Such collected ethylene dichloride may be purified by fractional distillation and separated from any residual content of ethylene dibromide, the latter being returned to the process.

In Fig. 2 similar reference characters apply to similar parts as in Fig. 1. This arrangement provides for an exchange of heat between condensing vapors in condenser coil 11 and the liquid being volatilized in vessel 2, such heat exchange supplying all or a part of the heat supplied by the steam coil shown in Fig. 1. The operation in this case will be the same as already explained, except that the condensed heavy liquid, ethylene dibromide, instead of being returned by gravity through pipes 9 and 13 to vaporizing vessel 2, flows to a receiver 15 from which it is returned to vessel 2 by pump 16 and pipe 17.

The procedure just described may also be applied with suitable modification for the chlorination of other gaseous olefines or of acetylene. Instead of ethylene bromide, other organic halides of materially higher boiling point than that of the product formed in the reaction may be employed, such as for example ethyl iodide, the latter being likewise effective for the purpose of the present invention.

A further modification in the operating procedure consists in substituting liquid bromine for organic bromide in vessel 2, the operation then proceeding in accordance with the method disclosed in my prior Patent 1,306,472. By such procedure a mixture of chlorine saturated with bromine vapor at the temperature prevailing in vessel 2 passes to the chlorinator tower, the reaction product then consisting of ethylene chlorbromide, $C_2H_4ClBr$, or containing such compound in proportion to the bromine content of the reacting gases. Such chlorbromide is condensed and separated in condenser 11 and separator 12, and returned continuously to vessel 2, replacing the bromine therein as the latter is carried away as vapor and consumed in the reaction. Such ethylene chlorbromide when returned to vessel 2 and mixed with a portion of the bromine remaining therein will be converted, at least partially, to the dibromide, thus liberating its chlorine which reenters the reaction circuit. Eventually all of the original bromine charge will be consumed and replaced by ethylene chlorbromide or dibromide, or a mixture of the two.

To recapitulate the advantages of the method herein disclosed: The reaction is conducted in the gas phase in the presence of vapors of organic halides of materially higher boiling point than that of the reaction product, thus permitting of much more easy and complete separation of the latter than when a diluting gas is employed which is more volatile than the reaction product; only a relatively small volume of reacting substances and diluting vapors need be maintained at the reaction temperature at any instant during operation of the process, thus conserving heat; the organic bromide or halide is constantly recycled, so that a relatively small amount thereof suffices to carry on the principal reaction indefinitely; the organic bromide, or iodide, is more than a diluent vapor in the reaction zone, having in addition a definitely repressive or anti-detonative action which tends to prevent molecular disruption or decomposition of the reacting substances or products.

Other modes of applying the principle of my invention may be employed instead of those explained, change being made as regards the process herein disclosed, provided the step or steps stated by any of the following claims or the equivalent of such stated step or steps be employed.

I therefore particularly point out and distinctly claim as my invention:—

1. The process of making chlorinated aliphatic hydrocarbons which comprises reacting chlorine with a gaseous unsaturated aliphatic hydrocarbon in an atmosphere of vapors of a halogenated aliphatic hydrocarbon containing a halogen of higher atomic weight than chlorine.

2. The process of making chlorinated aliphatic hydrocarbons which comprises reacting chlorine with a gaseous unsaturated aliphatic hydrocarbon in an atmosphere of vapors of a brominated aliphatic hydrocarbon of materially higher boiling point than the product of such reaction.

3. The process of making chlorinated aliphatic hydrocarbons which comprises reacting chlorine with ethylene in an atmosphere of vapors of a halogenated aliphatic hydrocarbon containing a halogen of higher atomic weight than chlorine.

4. The process of making chlorinated aliphatic hydrocarbons which comprises reacting chlorine with ethylene in an atmosphere of vapors of a brominated aliphatic hydrocarbon of materially higher boiling point than the product of such reaction.

5. The process of making chlorinated aliphatic hydrocarbons which comprises reacting chlorine with ethylene in an atmosphere of vapors of ethylene dibromide.

6. The process of making chlorinated aliphatic hydrocarbons which comprises bubbling chlorine gas through a body of ethylene dibromide, contacting the mixture of chlorine gas and ethylene dibromide vapor so obtained with ethylene, condensing and separating such ethylene dibromide from the ethylene dichloride reaction product and returning the former to the first step.

Signed by me this 19th day of December, 1928.

HERBERT H. DOW.